Patented Dec. 15, 1925.

1,565,839

UNITED STATES PATENT OFFICE.

KASPAR WINKLER, OF ALTSTETTEN, SWITZERLAND.

TREATMENT OF CEMENTITIOUS MATERIAL.

No Drawing.　　　Application filed December 14, 1920.　Serial No. 430,692.

*To all whom it may concern:*

Be it known that I, KASPAR WINKLER, citizen of Switzerland, residing at Gehrenweg 9, Altstetten, near Zurich, in the Canton of Zurich, Switzerland, have invented certain new and useful Improvements in Treatment of Cementitious Materials, of which the following is a specification.

With regard to waterproofing and drying of moist walls, floors, etc., it is an everyday observation that the waterproof cement, mortar and the like made according to known methods or by using the preparations which are to be found on the market fulfill their purpose, even in the most favorable circumstances, only if the work can be carried out with the complete exclusion of moisture and water and the subsoil or neighboring ground can be thoroughly drained beforehand. In those cases in which it is impossible to satisfy these preliminary conditions, the so-called waterproof building materials fail completely even if they actually possess in the highest degree the property attributed to them.

Complete imperviousness alone is not sufficient to render cement, mortar, concrete and the like suitable for use in carrying out such work. On the contrary, practical experience shows the necessity for the cement, mortar and concrete not only to be completely waterproof but also to retain their original good qualities to an undiminished extent and, further, to possess other and different properties or intensified qualities if they are to be fit for the purposes stated.

If, for example, it is a question of stopping up cracks, clefts or fissures in a tunnel or shaft to prevent leakage of water therethrough, without making preliminary excavations or conducting away the water, draining or other preparations, the task consists first of all in introducing or spreading the waterproofing material and causing it to adhere permanently. If this is not successfully accomplished then, having regard to the object in view, the fact that the material employed is perfectly waterproof loses all importance.

The known waterproof building materials, if employed for such purposes, fail right at the beginning in respect of the point mentioned. Either the material which is introduced is immediately expelled by the flow of water owing to its lack of adhering power or it yields after a short time under the pressure of the water held back. In this case another defect often makes its presence felt, since, on account of insufficiently-rapid hardening, the originally-adhering coating is broken by the water after a short time and is ejected in pieces.

It has long been known that good results are generally obtained when a calcium chloride solution, instead of water, is used for mixing. But it frequently happens that when the cement material is treated with such a solution a stand-still is reached in the action, the final hardening is incomplete and the final tensile and compression strength is not equal to that of ordinary Portland cement.

For this reason, it follows that where work of the character in question is involved, calcium chloride solutions can be used satisfactorily only when moderately quick setting and moderately great strength are sufficient.

I have discovered, however, that the above-mentioned objections in respect of the use of calcium chloride solutions are entirely avoided if powdered manganese dioxide is added to the solution, and the resultant solution then mixed with the cement material. The cement thus produced will possess all of the characteristics indicated above as absolutely necessary for properly carrying out the work.

For certain cements it has been found that in addition to the manganese dioxide, finely-pulverized chromium oxide should also be added to the calcium chloride solution. The chromium oxide is particularly favorable to the tensile and compression strength, as well as the power of adhesion, of Portland cement.

Very dilute solutions of calcium chloride, as well as very concentrated solutions thereof, have proven unsuitable. The former retard the setting operation, instead of accelerating it; whereas the latter have an extremely unfavorable influence on the tensile and compression strength of the cement. I have demonstrated, on the other hand, that for present purposes the most suitable concentration is that of about 23° Bé.; but the precise construction cannot be definitely stated because it depends upon, and will vary somewhat in accordance with, the character of the work and the nature and temperature of the water used for the solution.

The oxides are added to the said solution in quantities varying from ¼ to 3 per cent, according to circumstances. The mixture is used instead of water for mixing or gaging the cement. Care must be taken that the materials are mixed thoroughly and as quickly as possible, and that the finished mortar is used—i. e., applied—immediately and as rapidly as possible.

A cement which has been treated in accordance with the present invention begins to set after 2–5 minutes, and in 30 minutes it becomes as hard as ordinary cement after 20 hours. Its resistance to compression after 3 days is equal to that of ordinary cement which is 14–20 days old: it is higher after 28 days and increases still further with time. The constancy of volume is exceptional. The resistance to bending is about double that of ordinary cement. The imperviousness to water is, according to the nature and properties of the additional substances employed, either absolute or at any rate considerably greater than that of a cement made in the usual manner without these additions.

I claim as my invention:—

1. A process of treating cementitious material, comprising the step of gaging the material with a solution of calcium chloride of about 23° Bé., to which a quantity of a finely-pulverized oxide of manganese not exceeding 3% has been added, instead of with water.

2. A process of treating cementitious material, comprising the step of gaging the material with a solution of calcium chloride of about 23° Bé., to which a quantity of an oxide of manganese not exceeding 3% and chromium oxide, both in finely-pulverized form, have been added, instead of with water.

In testimony whereof I have affixed my signature.

KASPAR WINKLER.